Sept. 22, 1925.
J. STEINMETZ
1,554,384
MACHINE FOR THREADING PIPE
Filed March 17, 1924    3 Sheets-Sheet 1
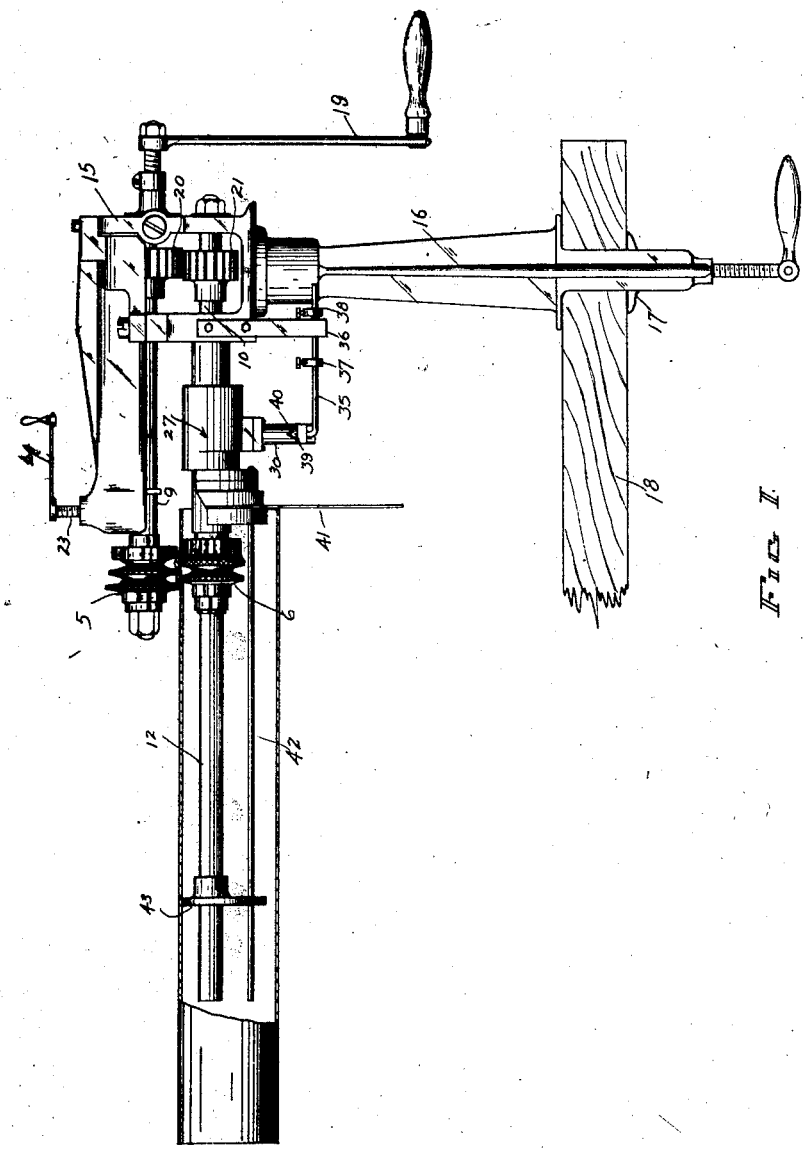
Fig. I.
INVENTOR.
JULIUS STEINMETZ
BY
ATTORNEYS.

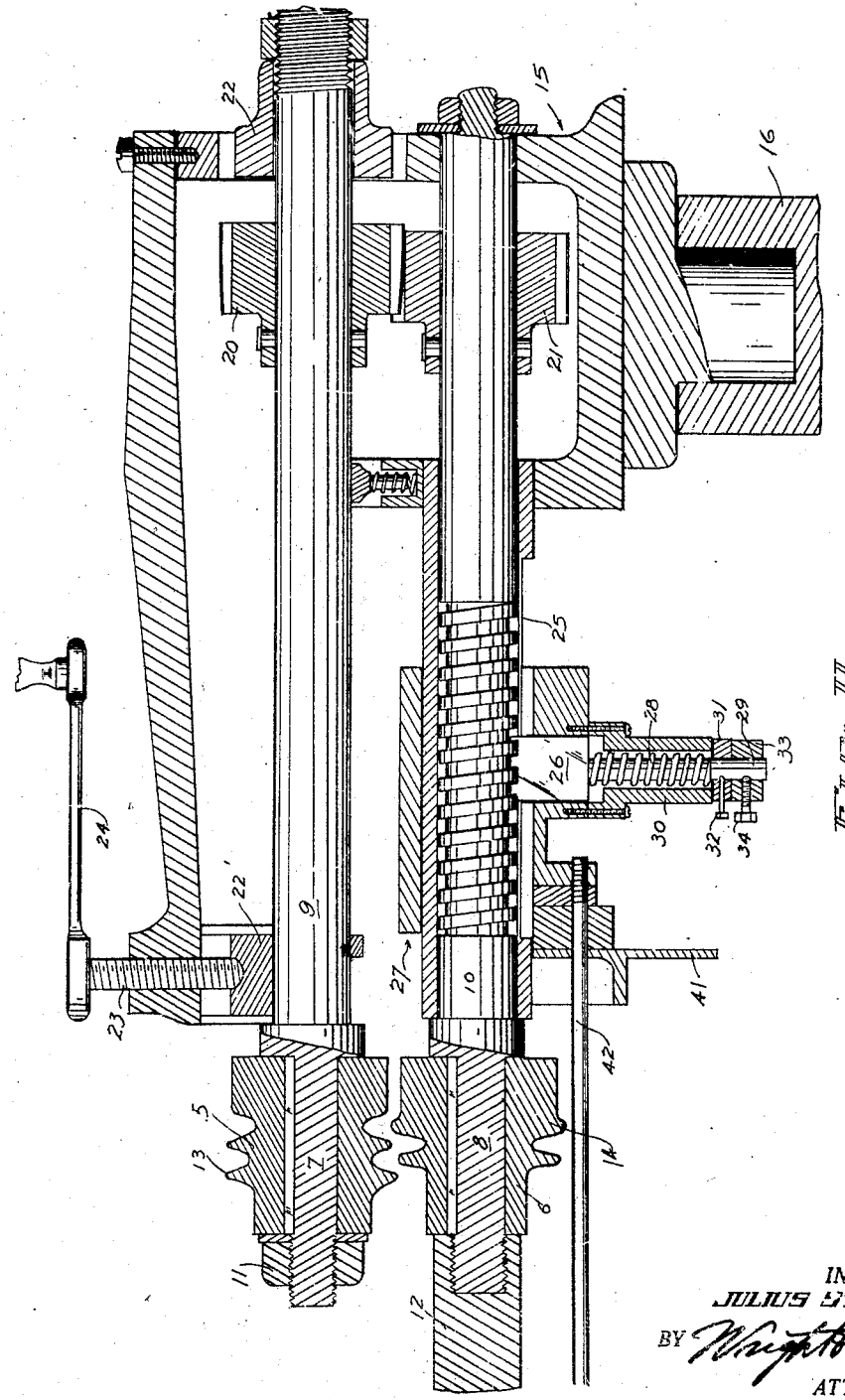

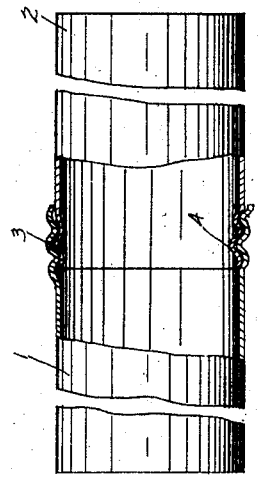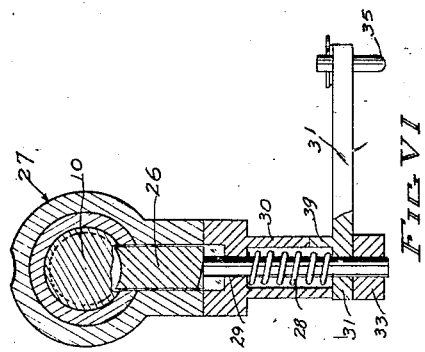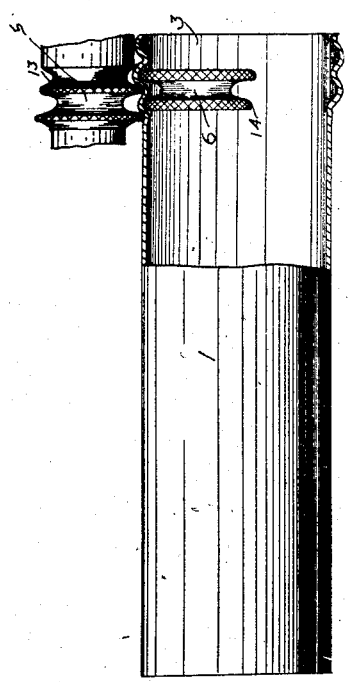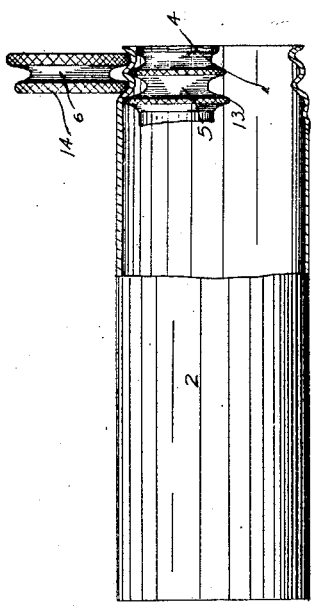

Patented Sept. 22, 1925.

1,554,384

UNITED STATES PATENT OFFICE.

JULIUS STEINMETZ, OF SAN FRANCISCO, CALIFORNIA.

MACHINE FOR THREADING PIPE.

Application filed March 17, 1924. Serial No. 699,658.

*To all whom it may concern:*

Be it known that I, JULIUS STEINMETZ, a citizen of the Republic of Czechoslovakia, residing at San Francisco, in the county of San Francisco and State of California, have invented new and useful Improvements in a Machine for Threading Pipe, of which the following is a specification.

The present invention relates to an improved machine for threading the ends of such piping to provide for the joining of the piping.

An object of the invention is to provide a screw joint for sheet metal piping wherein the ends of the piping telescope one another and may be quickly and easily connected with a comparatively tight joint which will not readily loosen.

Another object is to provide for a joint of the character described between sections of pipe of the same diameter, the formation of the threads in the ends of the pipe being such as to constrict one end and expand the other, whereby the constricted end may be screwed into the expanded end.

Another object of the invention is to provide a machine of a small, compact and simple construction, which machine may be easily and expeditiously operated to thread the pipe and shape the ends to provide for the joint of this invention, the operation of threading and expanding, or threading and constricting the pipe ends being simultaneous.

With the above-mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a side elevation of the machine of the invention;

Fig. 2 represents an enlarged longitudinal sectional view of the machine;

Fig. 3 represents a side elevation of the threading dies as when arranged to expand and thread a pipe end, showing the pipe in place between the dies;

Fig. 4 is a view similar to Fig. 3, showing the threading dies as when arranged to thread and constrict or reduce the pipe end;

Fig. 5 is a fragmentary sectional view of the pipe as when joined; and

Fig. 6 represents an enlarged detail sectional view of the means for causing the advance of the pipe.

In carrying out the invention as shown in the accompanying drawings, the ends of sheet metal pipes 1 and 2 are provided with threaded and expanded or enlarged and threaded and constricted or reduced ends respectively designated 3 and 4 and the end 4 is turned into the end 3 to provide for joining the pipe as shown in Fig. 5. This joint may be as quickly established as the ordinary stove pipe joint but will be more secure and tighter owing to the threads. The pipes 1 and 2 are of the same diameter except at their ends where for example, one end of the pipe will be expanded and threaded and the other reduced.

The reducing and enlarging of the ends is provided for by the threading dies 5 and 6 of the special machine shown in Figs. 1, 2 and 3. The dies are removably splined on the reduced ends 7 and 8 of rotary superposed shafts 9 and 10. A nut 11 holds the die 5 in place whereas an extension 12 of the shaft 10 is screwed onto the end 8 and holds the other die in place. The threading members or ribs 13 of the die 5 are thinner and have sharper edges than those 14 of the die 6 and when said die 5 is located above the die 6 (see Fig. 3) the pipe will be expanded or enlarged at its end as well as threaded, whereas, when in the reverse position as shown in Fig. 4, the end of the pipe will be constricted or reduced where threaded. The dies in being removable or interchangeable in the shafts may be quickly and easily reversed as to position to form the special joint ends on the pipes.

The shafts 9 and 10 are suitably journaled in a frame 15 mounted on a standard 16 having a clamp 17 at its lower end. The clamp is provided to attach the machine to a bench or like support 18. The shaft 9 has an operating crank 19 attached thereto and has a gear 20 thereon meshing with a similar gear 21 fixed to the shaft 10 whereby when the crank is turned the shafts and dies rotate in opposite directions. The shaft 9 extends through a pivoted bearing 22 near its crank end and through a vertically adjustable bearing 22' near its other end. Adjusting means 23 including a crank 24 is associated with the bearing 22 and provides for tilting the shaft to raise and lower the die on the upper shaft and thereby set the dies for different kinds of work. The shaft 10 is threaded as at 25 and actuates a threaded block 26 which is carried by a sliding carriage 27 supported on the shaft. The block is yieldingly held in contact with the threaded portion of the shaft by an expansion spring 28 surrounding a stem 29 which depends from the block. A casing 30 depending the from the carriage houses the stem and spring. The stem 29 projects out through the lower end of the casing 30 and has a crank arm 31 held thereon by means of a set screw 32, the spring abutting the crank arm. A collar 33 is mounted on the stem below the crank arm and is held in place by a set screw 34. Connected with the outer end of the crank arm is a rod 35 slidably mounted in an extension 36 in the frame 15. Adjustable stop members 37 and 38 are fixed to the rod 35 on opposite sides of the extension 36. As the shaft 10 revolves the screw threaded portion 25 operating on the block 26 carried by the carriage 27 causes the latter to travel forwardly and the rod 35 is pulled in the same direction until the stop 38 is encountered and the movement of the rod 35 is arrested. The crank arm has a V-shaped projection 39 engaging in a similar recess 40 provided in the casing 30 and as the carriage advances, the V-shaped member 39 is pulled out of the recess 40 and causes the stem 29 to pull downward thereby moving the screw block out of engagement with the screw threaded portion 25 of the shaft 10. This means regulates the feeding action of the carriage and its associated parts and may be set to cause the carriage and said parts to feed forwardly to the extent desired. An abutment plate 41 depends from the carriage 27 and is adapted to be engaged by the pipe to be operated upon. A rod 42 paralleling the extension 12 and extending from the carriage, serves with the extension, as a support for the pipe. A centering disk 43 is slidably mounted upon the extension 12 and rod 42 and holds the pipe in proper position to be treated in the machine.

The operation of the machine is as follows: The pipe to be treated is mounted upon the extension 12 and rod 42 around the centering disk and one end is pushed between the dies which are separated or moved apart through operation of the adjusting means 23, to lift upon the bearing 22'. The crank 19 is then turned so as to revolve the shaft 10 in a manner which will withdraw or pull inwardly on the carriage or abutment plate 42. If the thread is to extend over a distance of three inches from the end of the pipe, the stop members 37 and 38 are set and therefore held, three inches apart, taking into consideration the thickness of the extension 6. When the end of the pipe is engaged with the retracted abutment plate 41, the operator turns the crank 24 and lowers the shaft 9 to clamp the pipe between the dies 5 and 6. The depth of the thread may be regulated by the position of the two dies relative to one another. With the dies thus set the operator then rotates the crank in the opposite direction so as to cause the carriage to travel forwardly or outwardly, the dies thus engage the pipe at a distance several inches from the end and while the dies are rotating, the pipe is being pushed outwardly by the action of the carriage so that a spiral screw is formed in the pipe. When the die 5, being the one with the thick edged screw forming elements 13, is uppermost the end of the pipe being threaded is expanded or enlarged as shown in Fig. 3. The pipe is taken off and the other end placed between the dies and the operation repeated but with the dies reversed and in the position shown in Fig. 4, in forming the threads the end of the pipe will be constricted or reduced. This reversing of the dies is a simple operation requiring but a moment's time to put into effect. It will thus be seen that the machine of this invention may be quickly operated to form threads and expand and contract or enlarge or reduce the threaded ends of the pipe so that the ends may be quickly secured in a tight joint as shown in Fig. 5.

I claim:

1. A machine for threading the ends of sheet metal piping, comprising circular dies each consisting of a plurality of ribs of different thicknesses, means for rotatably supporting said dies one above the other, means for supporting pipe engaged between said dies, and means moving the pipe relative to the dies during rotation of the dies to form spiral threads on rotation of said dies.

2. A machine for threading the ends of sheet metal piping, comprising circular dies each consisting of a plurality of ribs of different thicknesses, means for rotatably supporting said dies one above the other, means for supporting pipe engaged between said dies, means moving the pipe relative to the dies during rotation of said dies, and means for adjusting said dies towards and away from one another to provide for insertion of the pipe between the dies and to regulate the depth of the threads.

3. A machine for forming threads at the ends of sheet metal piping, comprising rotary dies mounted one above the other, rotary members on which the dies are interchangeably mounted, said dies being of different thicknesses providing when in one position a constricting of the pipe being threaded and when in another position the expansion of the pipe being threaded, and means for rotating the dies.

4. A machine for forming threads at the ends of sheet metal piping, comprising rotary dies mounted one above the other, rotary members on which the dies are interchangeably mounted, said dies being of different thicknesses providing when in one position a constricting of the pipe being threaded and when in another position the expansion of the pipe being threaded, means for rotating the dies, and means moving the pipe relative to the dies during rotation of said dies.

5. A machine for forming threads in the ends of sheet metal pipe, comprising rotary dies mounted opposite one another having their thread forming elements of differing thicknesses, means for rotatably supporting said dies, members on which said dies are removably mounted to provide for reversing the positions of the dies, means for supporting pipe between the dies, means moving the pipe during rotation of the dies, means for moving the dies towards and away from one another, and adjustable stop means for regulating the extent of movement of said pipe.

6. A machine for forming threads in the ends of sheet metal pipe, comprising rotary dies mounted opposite one another, rotatable shafts upon which said dies are mounted, movable means for supporting pipe between the dies, one of said shafts having threads thereon, and means on said pipe supporting means arranged to engage the screw-threads on the shaft to cause movement of the pipe supporting means on rotation of said screw-threaded shaft, and means for simultaneously rotating the die supporting shafts.

JULIUS STEINMETZ.